(No Model.)
J. B. BAKER.
ROLLER BEARING.
No. 590,952. Patented Oct. 5, 1897.
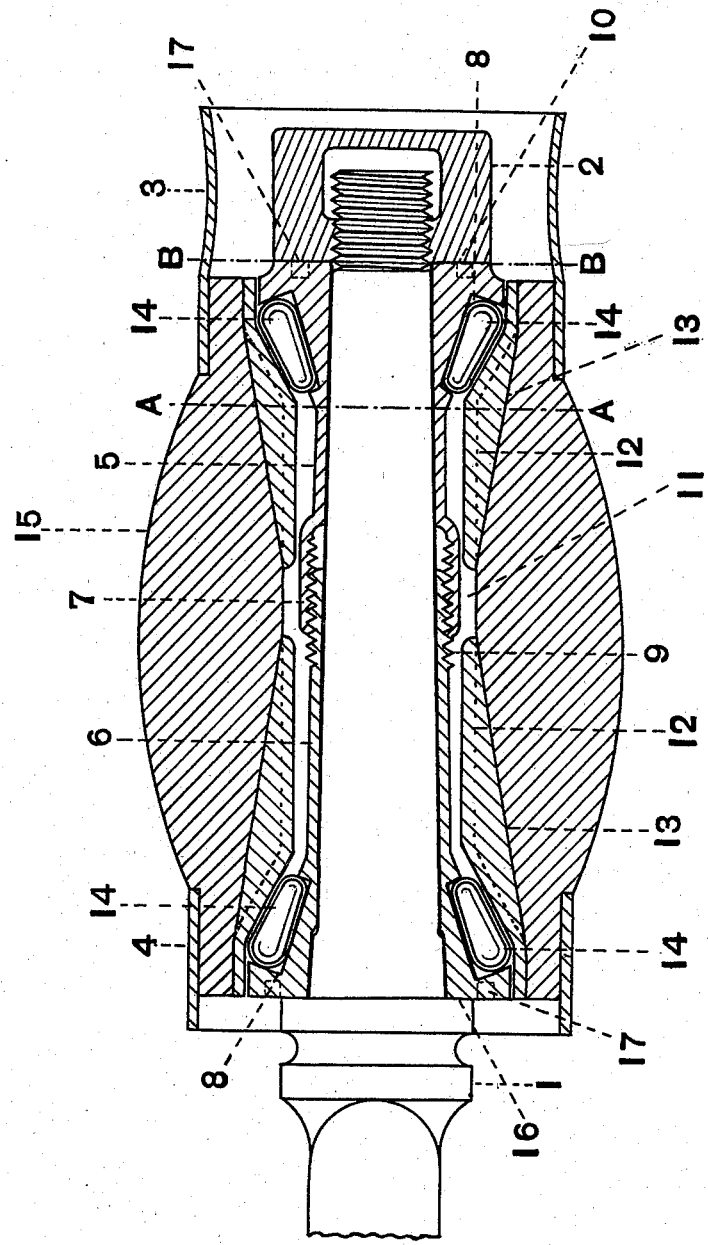
WITNESSES:
C. Chambers.
L. Snow.
INVENTOR
Joseph B. Baker.
BY
J. H. Snow.
ATTORNEY.

UNITED STATES PATENT OFFICE.

JOSEPH B. BAKER, OF NAPLES, TEXAS.

ROLLER-BEARING.

SPECIFICATION forming part of Letters Patent No. 590,952, dated October 5, 1897.

Application filed May 22, 1897. Serial No. 637,723. (No model.)

*To all whom it may concern:*

Be it known that I, JOSEPH B. BAKER, a citizen of the United States, residing at Naples, Texas, have invented certain new and useful Improvements in Roller-Bearings for Vehicles, of which the following is a specification.

My invention relates to improvements in roller-bearings for vehicles; and the object of my invention is to simplify the constructions heretofore employed in devices of this character and provide a roller-bearing that can be put in any hub and will fit the common standard axles now in use.

To this end my invention consists in the various constructions and combinations of parts hereinafter described, and set forth in the claims.

In the accompanying drawing the figure is a longitudinal sectional view of a part of an axle and hub fitted with my invention.

In the said drawing, 1 represents a spindle of an ordinary vehicle-axle which my device is adapted to fit without any turning or change in any way from the standard sizes now in use.

2 represents the common nut now in use.

3 indicates the common hub-band now in use at the outer end of the hub, and 4 indicates the common hub-band now in use at the inner end section of the hub.

5 represents the outer section of the adjustable sleeve for the rollers. 6 represents the inner section of the adjustable sleeve for the rollers. These sleeve-sections both fit the spindle 1 snugly and are held in place by the nut 2.

7 represents the threaded portion of the outer section of the sleeve.

8 represents the seats for the reception of the rollers.

9 represents the threaded portion of the inner sleeve-section 6, which is screwed into the outer sleeve-section 5.

10 represents the outer point of the sleeve-section, against which the nut 2 is screwed and forces the sleeve-sections on the spindle until the opposite end is pressed firm against the raised portion of the spindle at the rear or inner end, (indicated by 16.)

11 indicates an opening between the boxing-sections 12, which fit inside the hub 15.

13 represents the projections on the boxing-sections 12, designed to engage with the hub 15 to prevent the boxing-sections 12 from turning in the hub 15.

14 represents the tapered rollers adapted to rest in the pockets or seats for same in the sleeve-sections 5 and 6 at the points indicated by 8, and 15 represents the hub, preferably made of wood.

17 represents the holes in the ends of the sleeve-sections 5 and 6 for the purpose of inserting a wrench to tighten or loosen the bearing by screwing of one in the other at the threaded portions, (indicated by 7 and 9.) As the rollers 14 wear or wear the sleeve-sections 5 and 6 or the boxing-sections 12 the sleeve-sections 5 and 6 are screwed up farther by means of the wrench placed in the holes 17, and thus force the tapered rollers 14 toward the center of the tapered boxing 12, and in this way the wear is taken up and the rollers fit snug between the inner sleeve-sections 5 and 6 and the boxing 12.

Having thus described my invention, I claim—

1. The combination of a hub, an equal-sectioned sleeve with threaded engaging ends on the sections, said sleeve provided with exterior seats for the reception of rollers, rollers in said seats, and boxing-sections located outside the sleeve.

2. A roller-bearing comprising the sleeve made in sections, the inner ends of said sections being provided with threads whereby said sections are screwed together, and having exterior tapered seats in said sleeve for the reception of tapering rollers, rollers in said seats, and boxing-sections located outside said sleeve and bearing against said rollers, said boxing-sections being provided with projections adapted to prevent them from turning within the hub.

In testimony whereof I have hereunto set my hand this 17th day of May, A. D. 1897.

JOSEPH B. BAKER.

Witnesses:
J. L. JOLLY,
J. H. JOHNSTON.